UNITED STATES PATENT OFFICE.

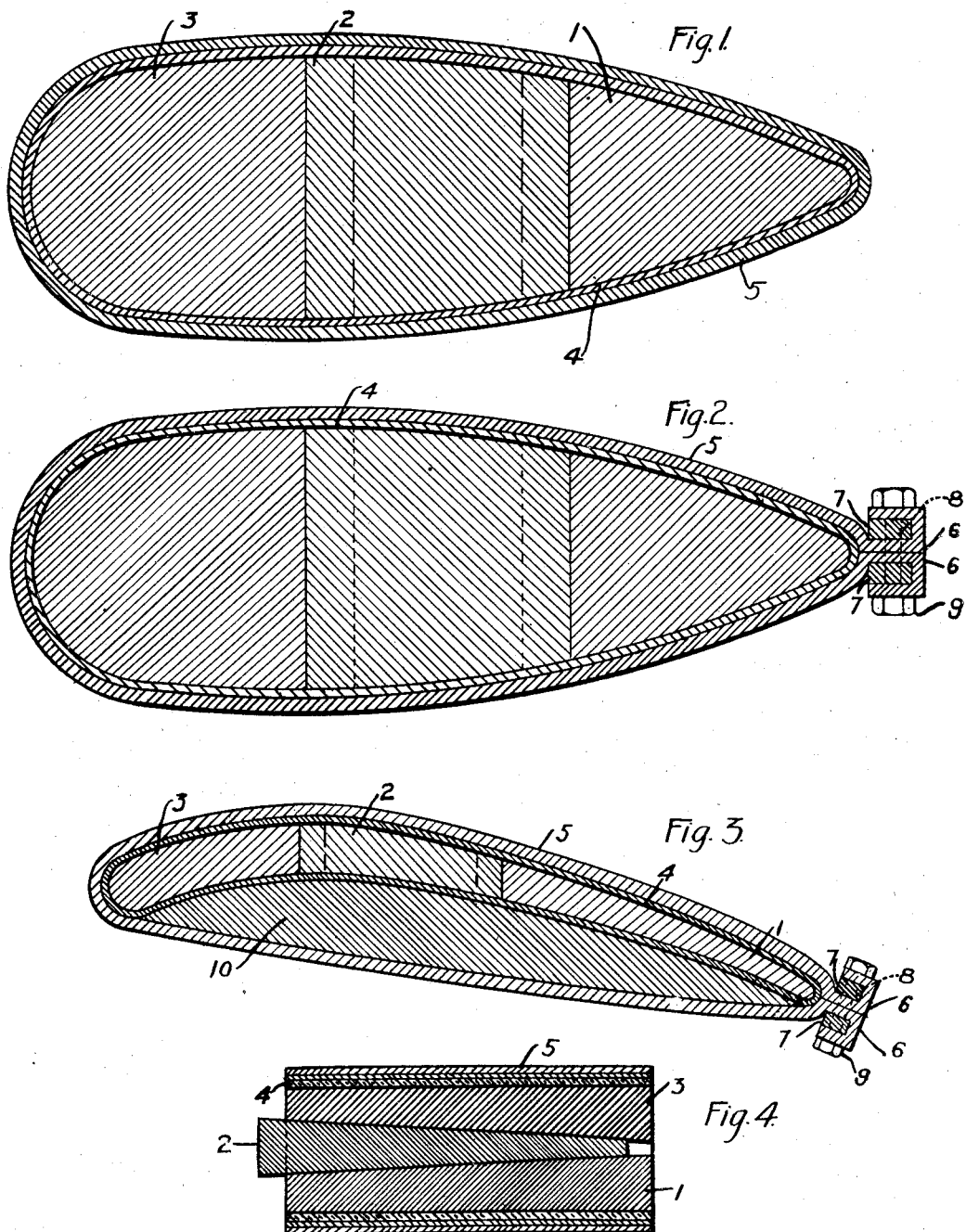

LOUIS T. FREDERICK, OF WILKINSBURG, PENNSYLVANIA, ASSIGNOR TO WESTINGHOUSE ELECTRIC AND MANUFACTURING COMPANY, A CORPORATION OF PENNSYLVANIA.

METHOD OF AND APPARATUS FOR MOLDING TUBULAR STRUCTURES.

1,335,105.     Specification of Letters Patent.     Patented Mar. 30, 1920.

Application filed May 13, 1918. Serial No. 234,139.

*To all whom it may concern:*

Be it known that I, LOUIS T. FREDERICK, a citizen of the United States, and a resident of Wilkinsburg, in the county of Allegheny and State of Pennsylvania, have invented a new and useful Improvement in Methods of and Apparatus for Molding Tubular Structures. of which the following is a specification.

My invention relates to improvements in molds and molding methods for use in manufacturing tubular structures embodying superimposed laminations of fibrous sheet material impregnated with a binder, and it has for its primary object the provision of a mold and a method which shall be adapted for manufacturing tubular structures of the above mentioned class, the walls of which are relatively thin.

Heretofore difficulty has been experienced in removing tubes, having relatively thin walls, from the molds in which they were formed. For this reason, one object of my invention is to provide a mold from which a molded tube may be removed without binding and consequent injury to its walls.

Previous to this, in molding tubes of impregnated fibrous sheet material having relatively thin walls and, consequently, a low tensile strength, the walls have frequently split when sufficient pressure was exerted to consolidate and form the tubes. In view of this, another object of my invention is to provide a mold which will obviate any tendency of the tube to split, irrespective of the pressure employed to form it.

A still further object of my invention is to provide a mold for tubes having relatively thin walls, such as stream-line tubes, in which internal pressure may be employed.

With these and other objects in view, a better understanding of my invention may be had by reference to the accompanying drawings in the several figures of which corresponding numerals refer to like parts throughout.

Figure 1 is a transverse sectional view of a mold embodying my invention, illustrating the application of the mold to the manufacture of stream-line tubes; Fig. 2 is a view similar to Fig. 1, showing a preferred form of my improved mold; Fig. 3 is a transverse sectional view of a mold embodying my invention, illustrating the application of the mold to the manufacture of aeroplane wings; Fig. 4 is a longitudinal, diametral section of a mold embodying my invention and a tube therein in the process of being formed.

In practising my invention, I may wind a sheet of suitable material about a split forming mandrel that is adapted to exert an internal expansive pressure on material disposed about it. An outer casing, which has the shape of the desired tube, may then be slipped over the core and the material disposed about it, after which heat and pressure may be applied to mold the material into a tube of the required shape and density.

Tubes molded according to my invention need not be so carefully or tightly wound as heretofore because the outer supporting casing permits the use of greater internal pressure than could otherwise be employed.

In the drawings, 1, 2 and 3 are wedge members which constitute a split forming mandrel or mold core about which the treated material 4 may be wound, or the material may be wound on a cylindrical mandrel having substantially the same circumference dimensions as the core or forming mandrel, and the material may then be taken off the cylindrical mandrel and placed on the core of the mold. When the material 4 is being disposed about the core comprising the wedge members 1, 2 and 3, the central wedge member 2 is preferably positioned as shown in Fig. 4, to allow for its movement and the resulting expansive action of the core, as a whole. As here shown, a layer of untreated material 4' may be superimposed upon the impregnated sheet material 4 to obviate any tendency of the material 4 to adhere to the outer supporting sleeve 5 which is slipped over the core and the material disposed about it. The wedge member 2 may then be driven home and heat applied to harden the material between the sleeve 5 and the mandrel. The sleeve 5 functions as a shaping mold, as well as a supporting means for the material 4, during expansion of the core. The sleeve or outer mold section 5 may be split longitudinally and may have its projecting edge portions 6 suitably shaped to receive reinforcing bars 7, the edge portions being adapted to be clamped together by means of bolts 8 and nuts 9 disposed at intervals along the mold. The outer casing 5, being resilient, will facilitate removing the finished tube when the bolts 8 are removed.

Although my improved mold is especially adapted to be used in the construction of stream-line tubes, it may, also, be employed with distinct advantage in the construction of aeroplane wings, as illustrated in Fig. 3, or cylindrical tubes, as shown in Fig. 4. When a tubular structure is to be molded which has a concave surface such as the aeroplane wing shown in Fig. 3, a suitably shaped strip 10 may be inserted between the mold and the tubular structure to insure compact molding of a properly shaped wall.

These and other like methods may be employed in molding tubes in accordance with my invention and I desire, therefore, that no limitations shall be imposed except such as are indicated in the appended claims.

I claim as my invention:

1. A mold comprising a split forming mandrel, an inclosing split resilient sleeve having its split edge portions bent to form channels, reinforcing bars disposed in said channels and means for clamping the edge portions together.

2. A mold comprising a forming mandrel having coadjacent wedge members that are adapted to exert an expansive action, an inclosing split resilient sleeve having projecting longitudinal edge portions bent to provide channels, reinforcing metallic strips disposed in said channels and means extending through the sides of the channels and strips for clamping said edge portions together.

3. A mold comprising a concave forming mandrel having coadjacent wedge members that are adapted to exert an expansive action, an inclosing split resilient sleeve having projecting longitudinal edge portions bent to provide channels, reinforcing strips disposed in said channels, a filler strip adapted to engage the concave surface of the mandrel and the inner surface of the sleeve and means for clamping the edge portions of the sleeve together.

4. A method of molding tubular structures comprising winding impregnated sheet material on an expansible forming mandrel, disposing said mandrel, with the sheet material wound on it, in a resilient sleeve and applying heat and expanding the mandrel to consolidate and form the material.

5. A method of molding tubular structures comprising winding impregnated sheet material on a split forming mandrel adapted to be expanded to exert a pressure on material disposed about it, inclosing said mandrel, with the material on it, in a split resilient sleeve provided with means for holding it in a closed position, expanding said mandrel to force the material about it into contact with said sleeve and applying heat to harden the impregnated sheet material.

In testimony whereof I have hereunto subscribed my name this 30th day of April, 1918.

LOUIS T. FREDERICK.